(12) United States Patent
Pelly

(10) Patent No.: US 7,088,843 B2
(45) Date of Patent: Aug. 8, 2006

(54) EMBEDDING DATA IN MATERIAL

(75) Inventor: Jason Charles Pelly, Reading (GB)

(73) Assignee: Sony United Kingdom Limited, Weybridge (GB)

( * ) Notice: Subject to any disclaimer, the term of this patent is extended or adjusted under 35 U.S.C. 154(b) by 809 days.

(21) Appl. No.: 10/006,294

(22) Filed: Dec. 6, 2001

(65) Prior Publication Data
US 2002/0118859 A1 Aug. 29, 2002

(30) Foreign Application Priority Data

Dec. 7, 2000 (GB) ................................. 0029855.4
Dec. 7, 2000 (GB) ................................. 0029860.4

(51) Int. Cl.
*G06K 9/00* (2006.01)
(52) U.S. Cl. ...................................... 382/100; 713/176
(58) Field of Classification Search ................ 382/100, 382/232; 713/176
See application file for complete search history.

(56) References Cited

U.S. PATENT DOCUMENTS 5,530,759 A * 6/1996 Braudaway et al. .......... 380/54

(Continued)

FOREIGN PATENT DOCUMENTS

EP 0 651 554 5/1995

(Continued)

OTHER PUBLICATIONS

Kim Young-Sik et al: "Wavelet based watermarking method for digital images using the human visual system" Electronics Letters, IEE Stevenage, GB, vol. 35, No. 6, Mar. 18, 1999, pp. 466-468, XP006011911, ISSN: 0013-5194.

(Continued)

*Primary Examiner*—Samir Ahmed
*Assistant Examiner*—Anand Bhatnagar
(74) *Attorney, Agent, or Firm*—Oblon, Spivak, McClelland, Maier & Neustadt, P.C.

(57) ABSTRACT

A method of embedding data in material comprises the steps of:
  embedding data in original material to produce data embedded material;
  removing the watermark from the data embedded material to produce recovered material;
  comparing the original and recovered material to determine the differences and locations of differences therebetween; and
  storing the said locations and corrections which correct the said differences.

A method of removing the data embedded in the material, comprises the steps of:
  removing the data from the material to produce recovered material;
  deriving the said corrections and locations from the said store; and
  using the corrections to correct the recovered material at the said locations.

A method of embedding data in material, preferably comprises the steps of:
  producing transform coefficients Ci representing a spatial frequency transform of the material, and
  combining the coefficients Ci with the data bits Ri to produce a modified coefficient Ci' where $Ci'=Ci+\alpha i Ri$ the method further comprising determining $\alpha i$ for each unmodified coefficient Ci as a function $F\{Cn\}_i$ of a predetermined set $\{Cn\}_i$ of transform coefficients Cn which set excludes the coefficient Ci.

42 Claims, 13 Drawing Sheets

U.S. PATENT DOCUMENTS

| | | | |
|---|---|---|---|
| 5,721,788 A * | 2/1998 | Powell et al. | 382/100 |
| 5,870,499 A * | 2/1999 | Bender et al. | 382/232 |
| 6,332,030 B1 * | 12/2001 | Manjunath et al. | 382/100 |
| 2004/0184637 A1 * | 9/2004 | Yamakage et al. | 382/100 |
| 2004/0258243 A1 * | 12/2004 | Shin et al. | 380/210 |
| 2004/0264732 A1 * | 12/2004 | Tian | 382/100 |

FOREIGN PATENT DOCUMENTS

| | | |
|---|---|---|
| EP | 1043687 A1 * | 10/2000 |
| EP | 1 098 522 | 5/2001 |
| EP | 1 189 372 | 3/2002 |
| GB | 2 329 547 | 3/1999 |
| WO | WO 01 76253 | 10/2001 |
| EP | 0 926 897 | 6/1999 |
| EP | 0 947 953 | 10/1999 |
| EP | 0 967 803 | 12/1999 |
| EP | 0 984 616 | 3/2000 |
| EP | 1 022 678 | 7/2000 |
| EP | 1 043 687 | 10/2000 |

OTHER PUBLICATIONS

IEEE Proc. Int. Conf. on Image Processing, vol. 1, 1997, F. Hartung and B. Girod, "Fast public-key watermarking of compressed video", pp.: 528-531.

Tencon 2000. Proceedings, vol.: 2, 2000, W.N. Cheung "Digital Image Watermarking in Spatial and Transform Domains" pp.: 374, 378 vol. 3.

C. Valens, "*A Really Friendly Guide To Wavelets*", 1999 (c.valens@mindless.com).

SMPTE Journal,*Proposed SMPTE Standard for Television —Unique Material Identifier (UMID)*. Mar. 2000, pp. 221-225.

* cited by examiner

US 7,088,843 B2

EMBEDDING DATA IN MATERIAL

BACKGROUND OF THE INVENTION

1. Field of the Invention

The present invention relates to embedding data in material. Embodiments of the invention relate to watermarking material.

"Material" as used herein means information material represented by information signals which includes at least one or more of image material, audio material and data material. Image material is generic to still and moving images and includes video and other information signals representing images.

2. Description of the Prior Art

Steganography is the embedding of data into material such as video material, audio material and data material in such a way that the data is imperceptible in the material.

Data may be embedded as a watermark in material such as video material, audio material and data material. A watermark may be imperceptible or perceptible in the material.

A watermark may be used for various purposes. It is known to use watermarks for the purpose of protecting the material against, or trace, infringement of the intellectual property rights of the owner(s) of the material. For example a watermark may identify the owner of the material.

Watermarks may be "robust" in that they are difficult to remove from the material. Robust watermarks are useful to trace the provenance of material which is processed in some way either in an attempt to remove the mark or to effect legitimate processing such as video editing or compression for storage and/or transmission. Watermarks may be "fragile" in that they are easily damaged by processing which is useful to detect attempts to remove the mark or process the material.

Visible watermarks are useful to allow e.g. a customer to view an image e.g. over the Internet to determine whether they wish to buy it but without allowing the customer access to the unmarked image they would buy. The watermark degrades the image and the mark is preferably not removable by the customer. Visible watermarks are also used to determine the provenance of the material into which they are embedded.

It is known to embed a watermark into material by applying a spatial frequency transform to the material embedding the watermark in the spatial frequency transform and applying an inverse transform to the watermarked material. A scaling factor is applied to the watermark. It is desirable to choose a scaling factor to improve the ability of the watermark to withstand unauthorised attempts to remove it; allow efficient authorised removal; reduce degradation of the unmarked material; and ensure that the mark is imperceptible where an imperceptible mark is desired. Those properties may be incompatible. Also, when material has been watermarked, it is desirable to be able to remove the mark. However, embedding a watermark in the material in such a way as to make difficult unauthorised removal may also have the consequence that the watermark is difficult to remove by an authorised person.

SUMMARY OF THE INVENTION

According to a first aspect of the present invention, there is provided a method of embedding data in material, the method comprising the steps of:

producing transform coefficients $C_i$ representing a spatial frequency transform of the material, and combining the coefficients $C_i$ with bits $R_i$ of the data to produce modified coefficients $C_i'$ $C_i'$ where $$C_i' = C_i + \alpha_i R_i$$

the method further comprising determining $\alpha_i$ for each unmodified coefficient $C_i$ as a function $F\{C_n\}_i$ of a predetermined set $\{C_n\}_i$ of transform coefficients $C_n$ which set excludes the coefficient $C_i$ wherein the coefficients are serially ordered and the coefficients $C_n$ are coefficients preceding coefficient $C_i$.

Preferably, the set $\{C_n\}i$ of transform coefficients is:

a) a set consisting of unmodified coefficients; or
b) a set consisting of modified coefficients; or
c) a set comprising modified and unmodified coefficients.

Thus $\alpha_i$ is adapted to each coefficient to which it is applied, allowing it to minimise degradation of the material. That also allows $\alpha_i$ to make the embedded data more robust against processing which intentionally or unintentionally damages the embedded data.

The set $\{C_n\}i$ of coefficients used to calculate $\alpha_i$ associated with coefficient $C_i$ excludes $C_i$. As will become apparent from the method of removing the data $R_i$, that allows exact recalculation of $\alpha_i$ in the removal process and thus exact removal of $R_i$ to restore the original material if no processing has occurred, and no clipping of the image in the spatial domain has occurred.

The invention allows $\alpha_i$ to be related to the other coefficients from which it is calculated by any suitable function.

The transform may produce coefficients $C_i$ in a plurality of frequency bands. The transform coefficients forming the set $\{Cn\}$ $\{C_n\}$; may be all in the same band. The transform coefficients forming the set $\{C_n\}_i$ may be in a plurality of bands. Using a set of coefficients $\{C_n\}_i$ in a plurality of bands allows the data $R_i$ to be concealed in the material using material properties in bands other than the band containing the data $R_i$. In a preferred embodiment, the coefficients are serially ordered and the coefficients $C_n$ are unmodified coefficients preceding coefficient $C_i$. During removal of the embedded data such ordering allows the coefficients to be used to calculate $\forall i$ for a subsequent coefficient $C_i$.

In such circumstances, the set $\{C_n\}_i$ may be:

a) the set consisting of unmodified coefficients; or
b) a set consisting of modified coefficients; or
c) a set comprising modified and unmodified coefficients.

Also, according to the first aspect of the present invention there is provided a method of removing data embedded in material according to the method of said one aspect, the method comprising the steps of.

determining the values of bits $R_i$ of the data;

calculating, for each modified coefficient $C_i'$, the value of the said function $F\{C_n\}_i$ of the corresponding set $\{C_n\}_i$ of coefficients $C_n$ to determine $\alpha_i$; and for each modified coefficient $C_i'$, subtracting therefrom $\alpha_i R_i$ to restore the unmodified coefficient value $C_i$, wherein the coefficients are serially ordered and the coefficients Cn are coefficients preceding coefficient $C_i$.

In a preferred embodiment, $\alpha_i$ is calculated from a set $\{C_n\}_i$ of unmodified coefficients. The method thus uses the restored coefficient $C_i$ as an unmodified coefficient $C_n$ of another set $\{C_n\}_j$ j of unmodified coefficients for restoring another coefficient $C_j'$j. It will be appreciated that the set $\{C_n\}_i$ excludes the coefficient $C_i'$. The set $\{C_n\}_i$ is of unmodified coefficients allowing $\alpha_i$ to be calculated exactly from the material in which the data $R_i$ is embedded. As a modified coefficient $C_i'$ is restored to its original value it is then available to be used to calculate $\forall_j$ for another coefficient $C_j'$.

In a preferred embodiment; the coefficients are serially ordered and the coefficients $C_n$ are unmodified coefficients preceding coefficient $C_i$. During removal of the embedded data such ordering allows the coefficients to be used to calculate $\forall_i$ for a subsequent coefficient j In such circumstances, the set $\{Cn\}_i$ may be:

a) the set consisting of unmodified coefficients; or b) a set consisting of modified coefficients; or c) a set comprising modified and unmodified coefficients.

According to a second aspect of the invention there is provided:

a) A method of removing data embedded in material comprising the steps of receiving material in which data is embedded;

accessing an information store storing information enabling the data to be removed; and removing the said data using the enabling data accessed from the store.

b) A method comprising the steps of embedding data in material; and storing in an information store information for enabling the data to be removed from the material.

c) Apparatus for removing data embedded in material comprising:

an input for receiving material in which data is embedded;

an information store for storing information enabling the data to be removed; and a remover arranged to remove the said data using the enabling data accessed from the store.

d) Apparatus comprising:

an embedder for embedding data in material;

a store for storing information for enabling the data to be removed from the material; and a generator for generating the enabling information when the said data is embedded in the material.

The provision of the stored enabling data allows access to enabling data which allows the embedded data to be removed. In preferred embodiments of this aspect of the invention, the enabling data is stored in a manner which is secure against unauthorised access to it.

Methods of preventing unauthorised access to secure data are well known.

It has also been found that, in for example video material, embedding watermarks in identical fashion in different images results in differing degrees of difficulty in removing the watermarks.

According to the second aspect of the present invention, there is also provided a method comprising the steps of:

embedding data in first material to produce second material in which data is embedded;

removing the data from the second material to produce recovered material;

comparing the first and recovered material to determine the differences and locations of differences therebetween; and storing corrections which correct the said differences and data identifying the said locations at which the differences occur in the first material.

The second aspect also provides apparatus for embedding data in material comprising:

an embedder for embedding data in first material to produce second material in which data is embedded;

a remover for removing the data from the second material to produce recovered material;

a comparator for comparing the first and recovered material to determine the differences and locations of differences therebetween; and a store for storing data identifying the said locations and corrections which correct the said differences.

According to the second aspect of the present invention there is also provided a method of removing data embedded in material, the data being embedded in the material according to the embedding method of said second aspect, the removing method comprising the steps of:

removing the data from the second material to produce recovered material; deriving the said corrections and locations from a store storing data identifying the said locations and corrections which correct the said differences; and using the corrections to correct the recovered material at the said locations.

The second aspect also provides apparatus for removing data from material in which the data has been embedded by the apparatus of said second aspect, the removing apparatus comprising:

a remover for removing the data from the second material to produce recovered material;

a deriver for deriving the said corrections and locations from the said store; and a corrector arranged to use the stored corrections to correct the recovered material at the said locations.

The second aspect of the invention also provides a system comprising a combination of the apparatus of the said second aspect (herein after a data embedder) and the apparatus of said third aspect (herein after a data remover).

Ideally, the second aspects of the invention operate optimally with a lossless channel between the embedding apparatus and the removing apparatus. If the channel between the embedding apparatus and the removing apparatus is known, an emulator emulating that channel may be provided in the embedding apparatus between the embedded and remover of the embedding apparatus.

BRIEF DESCRIPTION OF THE DRAWINGS

The above and other objects, features and advantages of the invention will be apparent from the following detailed description of illustrative embodiments which is to be reads in connection with the accompanying drawings, in which.

DESCRIPTION OF THE PREFERRED EMBODIMENTS

Figure 1:
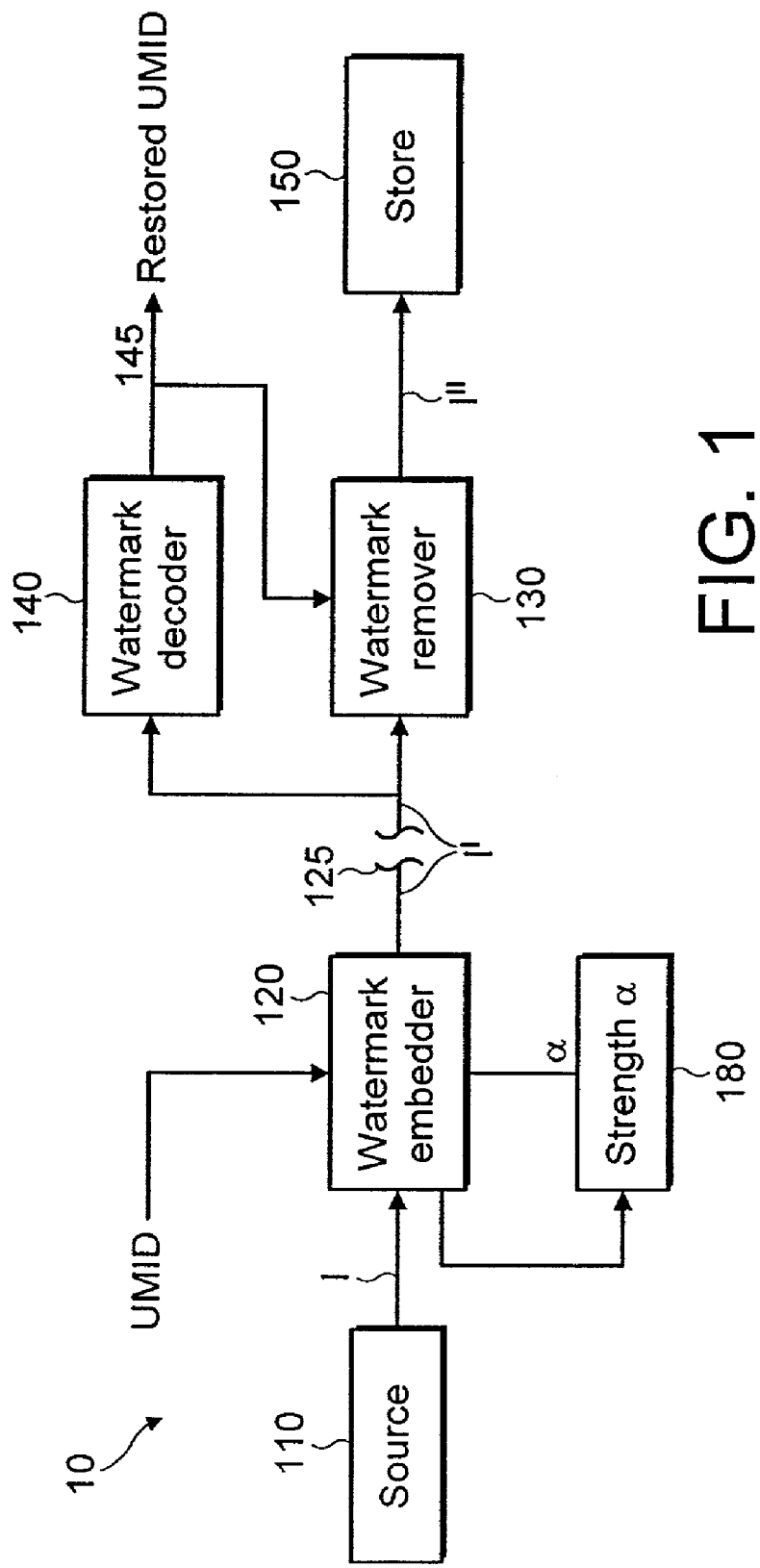
FIG. 1 is a schematic block diagram of a watermark embedding and removal system.

FIG. 1 illustrates a watermarking system for embedding, recovering and removing a watermark onto or from a video image I. The watermarking system 10 comprises a source 110 of the image 1, a strength adapter 180, a watermark embedder 120, a watermark decoder 140, a watermark remover 130 and a store 150. The decoder and remover may be coupled to the embedder via a channel 125 which may include a video processor, and/or a store.

In overview, the watermark embedder 120 embeds a watermark onto a video image I to form a watermarked image I', the watermark decoder 140 recovers the watermark from the watermarked image I' and the watermark remover 130 removes the watermark from the watermarked image I' to produce a restored image I". The restored image I" may not be identical to the original image 1, especially if the channel 125 includes a processor and/or if clipping of the image in the spatial domain occurs.

The watermark embedder 120 receives, in this example, as watermark data, a UMID. UMMDs are described in the section UMIDs below. The strength adapter 180 determines the magnitude of a parameter a, referred to herein as the strength of the watermark in relation to the video image I. The strength $\forall$ is determined such that the watermark may be recovered whilst minimising its perceptibility to a viewer of the watermarked image I'. The watermarked image I' may then be stored, and/or transmitted and/or routed for further processing, in the channel 125.

The watermark decoder 140 generates a restored UMID 145 from the watermarked image I'. The watermark remover 130 generates a restored image I" from the watermarked image I' using the restored UMID.

Figure 2:
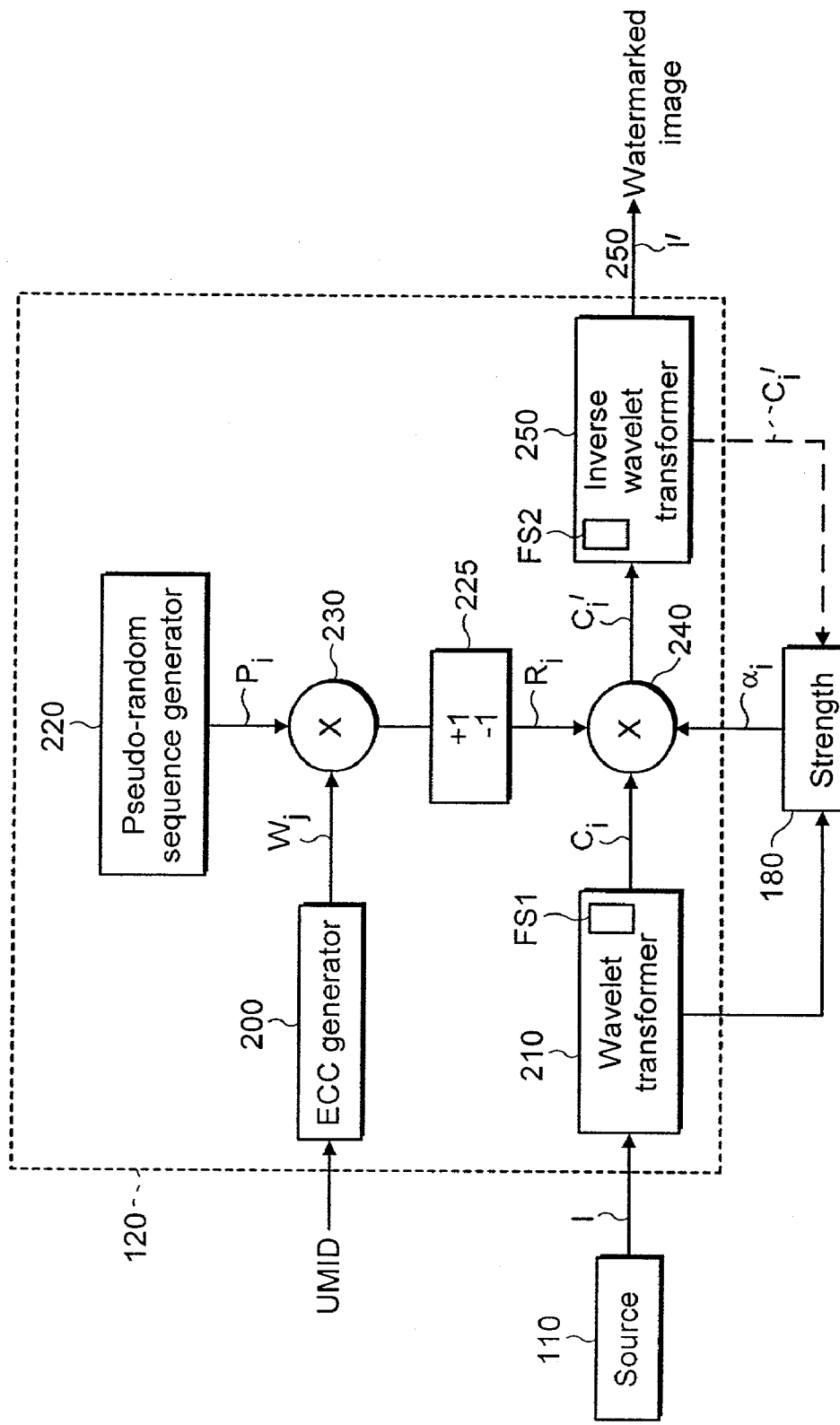
FIG. 2 is a more detailed schematic block diagram of an embedder of the system of FIG. 1.

Watermark Embedder, FIG. 2.

FIG. 2 illustrates the watermark embedder 120 in more detail. The watermark embedder 120 comprises pseudo-random sequence generator 220, an error correction coding generator 200, a wavelet transformer 210, an inverse wavelet transformer 250, a first combiner 230, a data converter 225 and a second combiner 240. The wavelet transformer 210 includes a frame store FS1. The inverse transformer 250 includes a frame store FS2. The frame store FS1 stores a frame of unmodified coefficients Ci. The frame store FS2 stores a frame of modified coefficients $C_i'$.

The error correction coding generator 200 receives the UMID and outputs an error correction coded UMID to the first combiner 230. The pseudo-random sequence generator 220 outputs a pseudo-random binary sequence (PRBS) $P_i$; where i is the $j^{th}$ bit of the sequence, to the first combiner 230. The PRBS has a length L×J of bits where J is the number of bits in the error correction encoded UMID. Each bit j of the error correction encoded UMID then modulates a section of length L of the PRBS. The first combiner 230 logically combines the error correction encoded UMID with the PRBS to produce a watermark having bits $R_j$. A bit $W_j=0$ of the error correction encoded UMID inverts L bits of the PRBS. A bit $W_j=1$ of the error correction encoded UMID does not invert the PRBS. Thus bits $W_j$ of the error correction encoded UMID are spread over L bits of the PRBS. The data converter 225 converts binary 1 to symbol +1 and binary 0 to symbol −1 to ensure that binary 0 bits contribute to a correlation value used in the decoder of FIG. 5.

The wavelet transformer 210 receives the video image I from the source 110 and outputs wavelet coefficients $C_i$ to the second combiner 240. Wavelets are briefly discussed in the section Wavelets below.

The second combiner 240 receives the watermark $R_j$, the wavelet coefficients $C_i$ and watermark strength $\forall i$ and outputs modified coefficients $C_i'$ where $C_i'=C_i+\alpha_i R_i$ The inverse wavelet transformer 250 receives the modified coefficients $C_i'$ and outputs a spatial domain watermarked image I'.

The embedder includes an ECC generator 200. The use of error correction coding to produce an error correction coded UMID is advantageous since it allows the UMID 175 to be reconstructed more readily should some information be lost. This provides a degree of robustness to future processing or attacks against the watermark. The use of a pseudo-random sequence $P_i$ to generate a spread spectrum signal for use as a watermark is advantageous since it allows the error correction coded UMID 205 to be spread across a large number of bits. Also, it allows the watermark to be more effectively hidden and reduces the visibility of the watermark. Applying the watermark to a wavelet transform of the image is advantageous since this reduces the perceptibility of the watermark. Furthermore, the strength of the watermark is adjusted by $\forall_i$ to ensure that the watermark is not perceptible.

The operation of the error correction code generator 200 will now be described. The error correction code generator 200, receives a UMID. Typically the UMID will be a binary sequence of 31 bytes. The error correction code generator 200 typically outputs a 511 bit error correction coded binary sequence. Various error correction coding schemes are known. One approach uses BCH coding which corrects up to 31 bit errors. The error correction rates can be further improved by using knowledge of the UMID format to help correct errors. One such approach is to check for invalid dates times GPS locations etc.

The watermark is preferably embedded in predetermined regions of the wavelet transformed image. Most preferably the upper horizontal (hH,1V) and upper vertical (1H.hV) bands are used. These bands are chosen as watermarks embedded in these regions are not readily perceptible. The length of the pseudo-random sequence may be chosen such that the watermark fills the predetermined regions in each wavelet image. The regions in which the watermark is embedded may be within a border of unmodified coefficients thereby allowing the image to the spatially shifted without the watermark being lost.

Figure 3A:
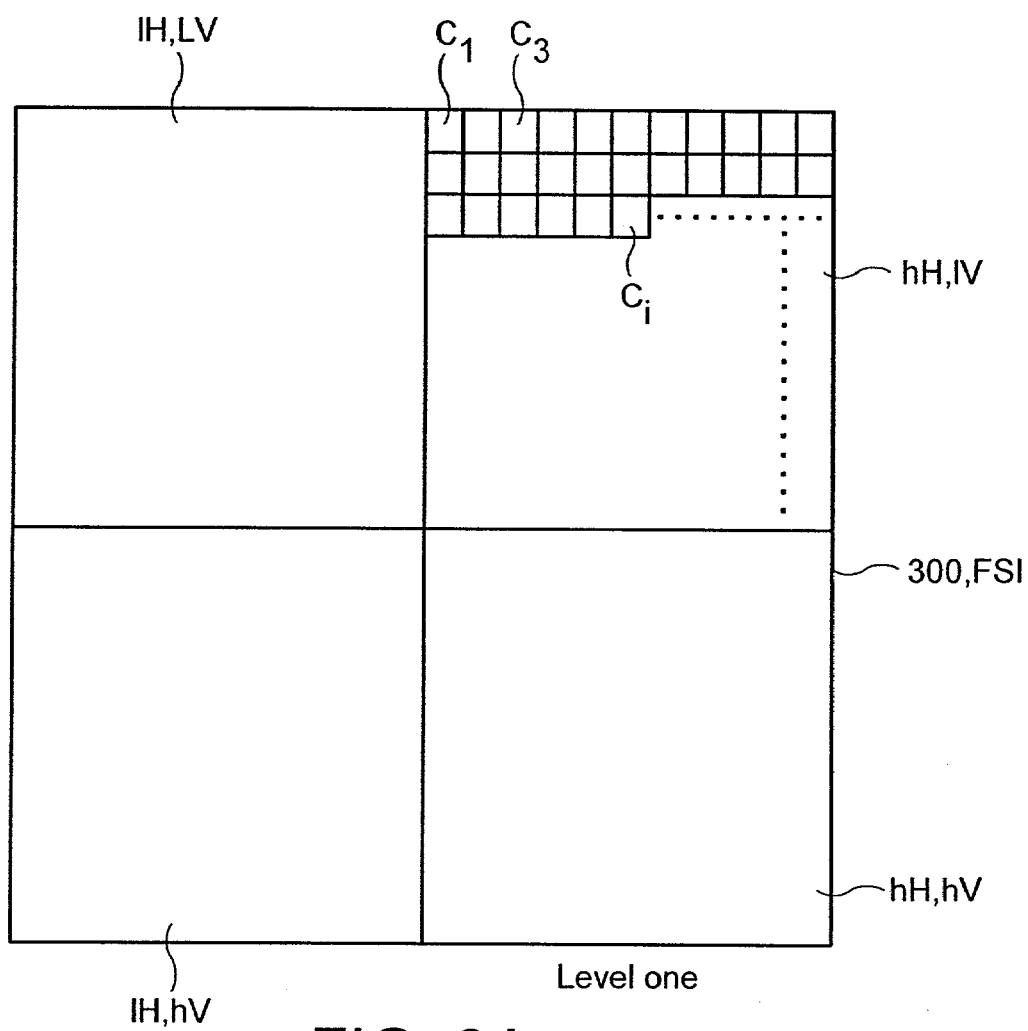
FIGS. 3A and B illustrate an example of a window of coefficients and how the window relates to a coefficient $C_i$ being modified to embed a bit of a watermark.
Figure 3B:
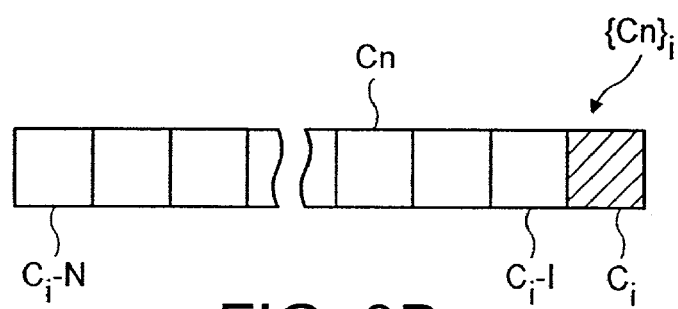
Figure 4:
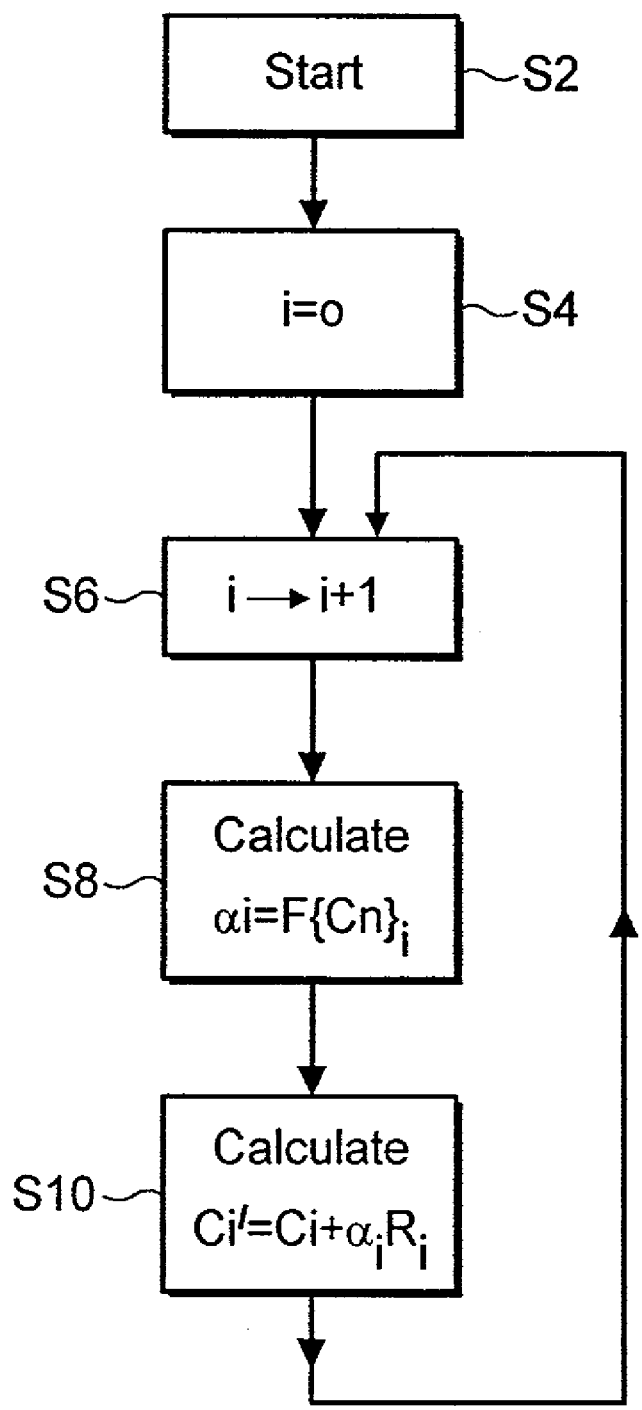
FIG. 4 is a flow diagram of a method of calculating strength $\forall$ in accordance with an example of the invention.

Calculating $\forall$, FIGS. 3 and 4.

In accordance with an illustrative embodiment of the invention; for each coefficient $C_i$, a value of $\forall$, $\forall_i$ is calculated $\forall_i$ is calculated as $\alpha_i=F\{C_n\}_i,$ where $\{C_n\}_i$ is a set of unmodified wavelet coefficients excluding $C_i$, which set may vary with i, that is respective values of $\alpha_i$ are functions F of respective sets $\{C_n\}_i$. This is shown as step S8 in FIG. 4.

Figure 8:
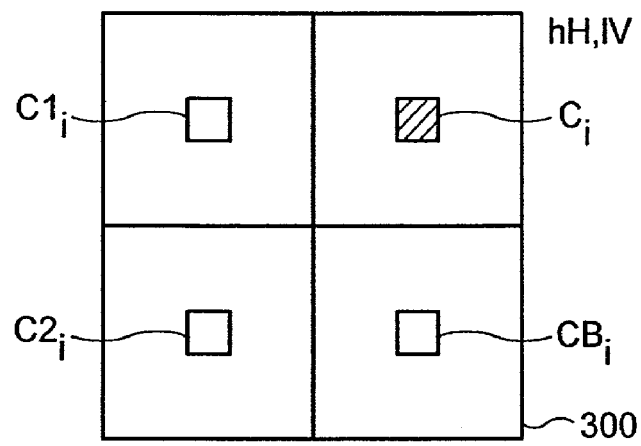
FIG. 8 is a schematic diagram of an alternative, illustrative, set of coefficients usable to calculate $\forall$.

The coefficients $\{C_n\}_i$ of the set may be in the same wavelet band as $C_i$ or may be in different bands from $C_i$ and from each other as described below with reference to FIG. 8.

If the coefficients are in the same band as $C_i$, they are preferably in a window adjacent $C_i$. For example the set comprises N coefficients $C_i-1$ to $C_i-N$ as shown in FIG. 3 and the embodiment will be described in the following with reference to that.

The number N of coefficients may vary with $C_i$; thus for generality N is denoted as $C_i$.

The function F may be any suitable function. In this illustrative embodiment F is such that $$\alpha i = F\{Cn\}i = \frac{1}{Ni} \cdot \sqrt{\sum C_n^2}$$

for n=i-1 to i-N for $N_i \neq 0$ and $\alpha_i = k$ for $N_i = 0$.

FIG. 3A is a map of wavelet coefficients in a frame store 300, the coefficients being in level 1 of a wavelet transform. In a preferred embodiment, the coefficients $C_i$ are modified only in the upper horizontal hH, 1V and upper vertical 1H, hV bands to embed the watermark. However, coefficients in other bands and/or in other levels may be modified to embed a watermark. In the following only band hH, 1V is considered.

The wavelet coefficients are stored in the frame store 300 (also denoted FS1 in FIG. 2) and in this example are stored as shown in FIG. 3A grouped in the bands. The coefficients are serially ordered. For example they may be serially ordered by a raster scan thereof. Other scanning patterns are known. Assuming serial ordering of the coefficients in each band, for each coefficient $C_i$ to be modified, there is defined a set $\{C_n\}_i$; (herein also referred to as a 'window') of $N_i$ coefficients excluding $C_i$. The set $\{C_n\}_i$ consists of the $N_i$ coefficients $Ci_{-1}$ to $C_{i-Ni}$ preceding coefficient $C_i$ on the same line, up to a maximum of for example M most recent coefficients. It will be noted that in the band hH,1V coefficient $C_1$ has no preceding coefficients. $C_2$ has only one preceding coefficient, and so on. For coefficient $C_1$, $\forall_i$ is set to a predetermined value K. For subsequent coefficients the set comprises the totality of preceding coefficients.

Thus $\forall_i$ is defined individually for each coefficient $C_i$ to be modified. In the example above it is defined by the set of $N_i$ unmodified coefficients preceding $C_i$. By choice of the appropriate function F, $\forall_i$ is adapted to the image such that image degradation can be minimised. In addition as will be discussed below in the section Remover, this allows $\forall_i$ to be recalculated from the watermarked image coefficients, after those have been restored to their original values. This improves the accuracy of restoring the original image.

Referring to FIG. 4 the illustrative procedure for calculating $C_i'$ is as follows:—The calculation procedure starts at step S2. At step S4, i is initialised with value 0. At step S6, i is incremented by 1 to calculate $\forall 1$ at step S8 for coefficient $C_1'$. At step S10 the value of modified coefficient $C_1'$ is calculated. The procedure then reverts to step S6 and i is incremented. The procedure continues until all coefficients have been modified.

In addition, the calculation of $\forall_i$ may be modified in one or both of the following ways:—

1) If $\alpha_i < \alpha_{TL}$, it is incremented to $\alpha_{TL}$, where $\alpha_{TL}$ is a lower threshold; and if $\alpha_i > \alpha_{TH}$ it is reduced to $\alpha_{TH}$, where $\alpha_{TH}$ is an upper threshold.

2) The magnitude $|C_n|$ of each coefficient is compared with a threshold $C_{TH}$.

If $|C_n| > C_{TH}$ then $C_n$ is not included in the calculation of $\alpha_i$; or if $|C_n| > C_{TH}$, then $C_n$ is clipped to $(C_n/|C_n|)C_{TH}$.

Figure 5:
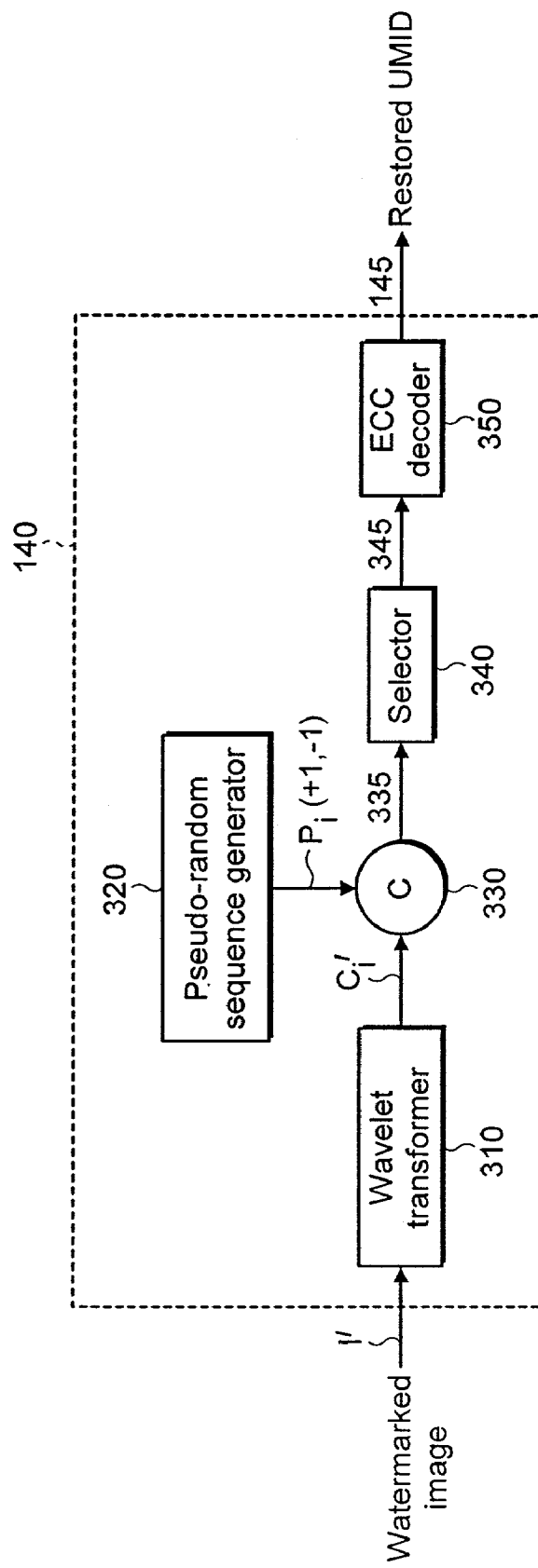
FIG. 5 is a schematic block diagram of a watermark decoder.
Figure 6:
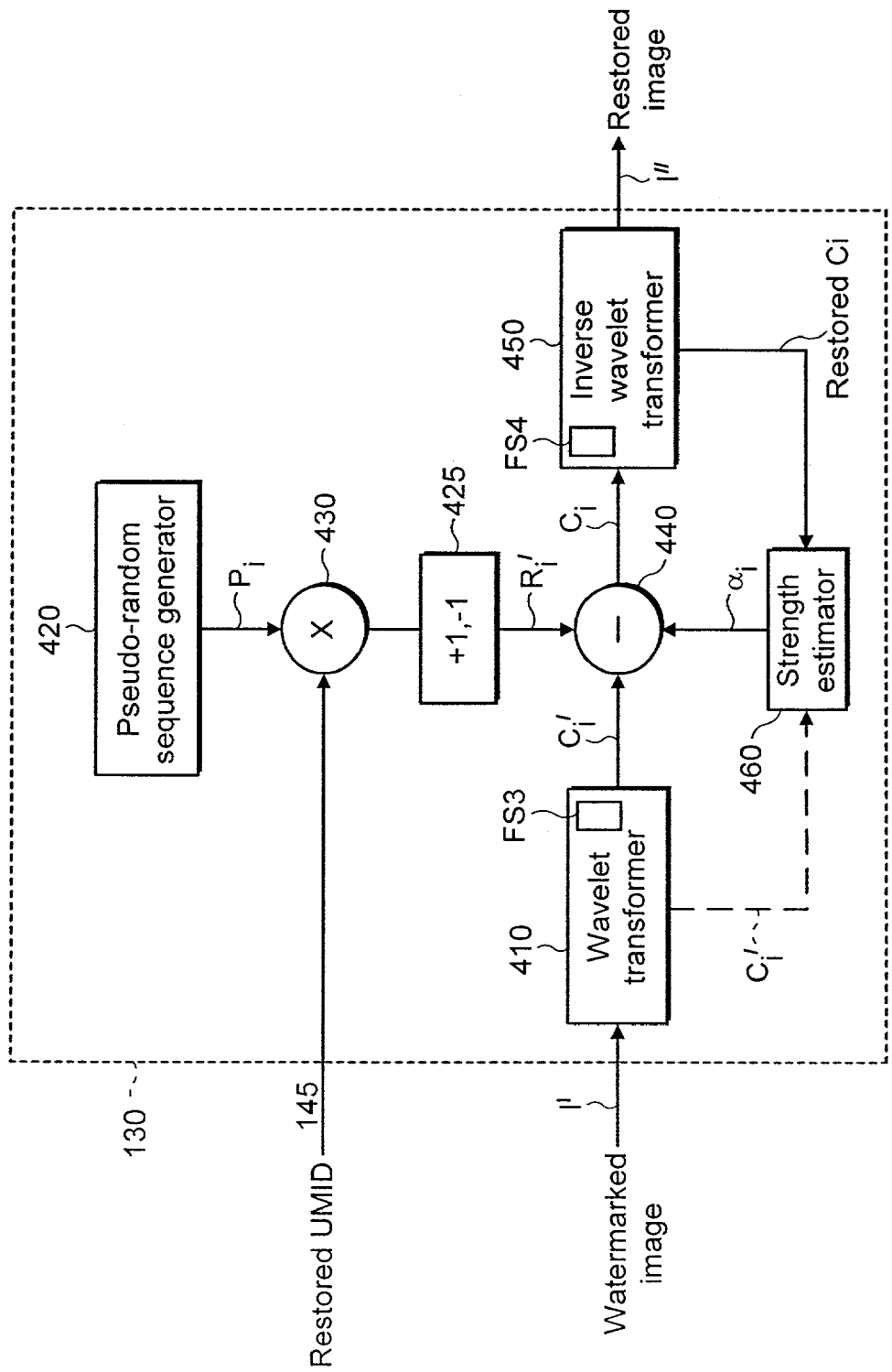
FIG. 6 is a schematic block diagram of a watermark remover.

Watermark Decoder and Remover. FIGS. 5 and 6.

Decoder FIG. 5

The operation of the watermark decoder 140 will now be explained in more detail with reference to FIG. 5. The watermark decoder 140 receives the watermarked image I' and outputs the restored UMID. The watermark decoder 140 comprises a wavelet transformer 310, a reference pseudo-random sequence (PRBS) generator 320, a correlator 330, a selector 340 and a error correction coding decoder 350. The PRBS generated by the generator 320 is identical to that generated by the PRBS generator 220 of FIG. 2 and converted by a data converter (not shown) to values +1 and −1 as described above.

The wavelet transformer 310 receives the watermarked image I' and, in known manner, outputs the modified wavelet coefficients $C_i'$. The correlator 330 receives the reference pseudo-random sequence PRBS having symbols Pi of values +1 and −1 from the pseudo-random sequence generator 320, and the wavelet coefficients $C_i'$ and outputs a watermark image bit correlation sequence 335. The watermarked image bit correlation sequence is determined in the following way.

The modified wavelet coefficients $C_i' = C_i + \alpha_i R_i$ where $R_i$ are bits of PRBS modulated by error-correction encoded bits $W_j$ of UMID. In the example given above there are 511 bits $W_j$. Each bit $W_j$ modulates L bits of PRBS. There are JL bits in the modulated PRBS.

For each error correction encoded bit $W_j$, the correlater 330 calculates a correlation value $$S_j' = \sum_{i=jL+1}^{jL+L} Ci' \cdot Pi$$

where j=0, 1, 2 ... T−1, and T is the number of error correction encoded bits. In this example T=51 1. A sequence 335 of correlation values $S'_j$ is produced.

The correlation sequence 335 is received by the selector 340 which outputs an uncorrected UMID 345. The selector 340 outputs a bit value "1" for a value of S' greater than 0 and a bit value "0" for S' less than or equal to 0. The error correction code decoder 350 receives the uncorrected UMID 345 and in known manner outputs the restored UMID 145.

The reference PRBS $P_i$ is synchronised with the modulated PRBS in the watermarked image. For that purpose a synchroniser (not shown) is used. Such synchronisation is known in the art.

Remover FIG. 6.

The watermark remover 130 receives the restored UMID 145, and the watermarked image I' and outputs a restored image I". The watermark remover 130 comprises a pseudo-random sequence generator 420 for generating a reference pseudo random sequence $P_i$ identical to that produced by generators 220 and 320, a spread spectrum signal generator 430 which produces, via a data converter 425, a restored watermark Ri' having bit values +1 and −1 from the restored UMID 145 and the pseudo-random sequence $P_i$. The reference sequence $P_i$ is synchronised with the modulated sequence in the watermarked image in known manner.

The watermark remover 130 further comprises a wavelet transformer 410 which produces modified wavelet coefficients $C_i'$ from the watermarked image I', a strength estimator 460 for calculating $\forall_i$ and a combiner 440 which calculates restored wavelet coefficient values according to the equation $$C_i = C_i' - \alpha_i . R_i'.$$

The restored wavelet coefficients C are fed to an inverse wavelet transformer 450 which outputs the restored image I".

Figure 7:
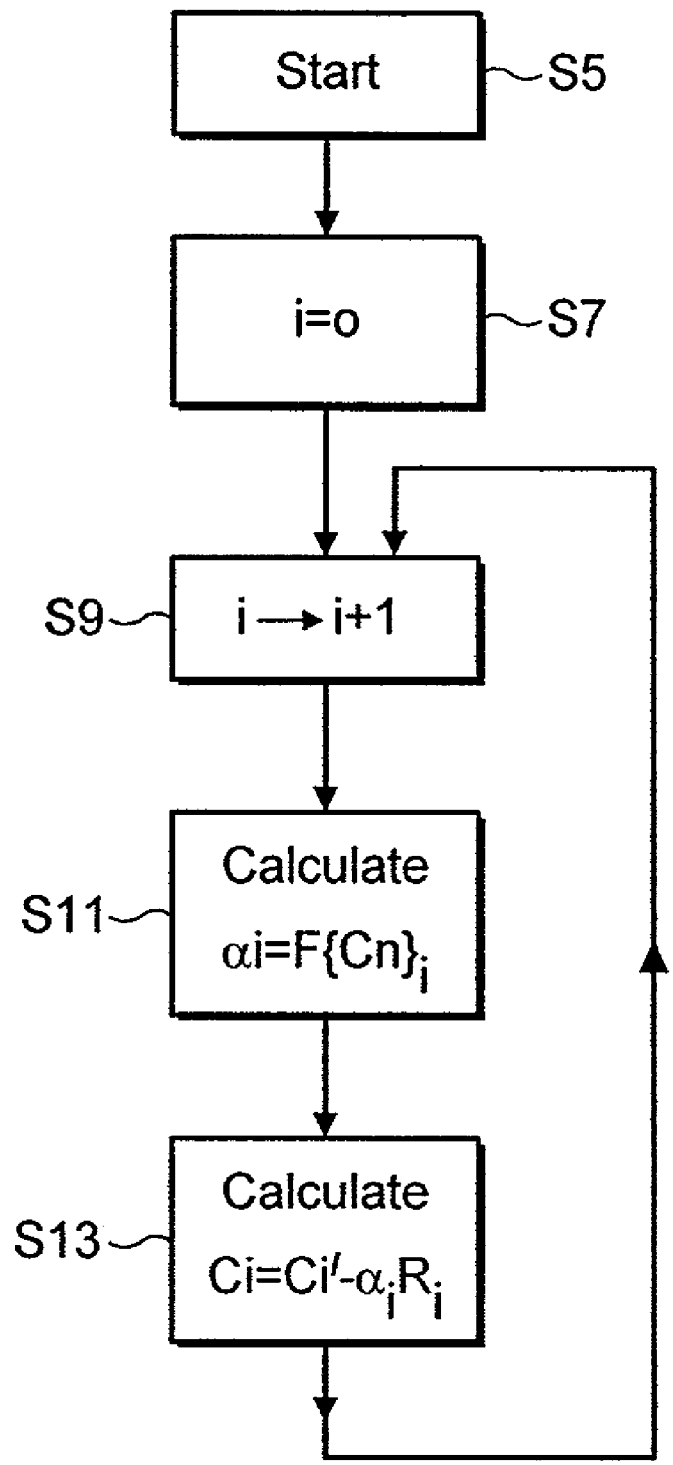
FIG. 7 is a flow diagram of a method of calculating strength $\forall$ in accordance with an example of the invention.

Calculating $\forall_i$, FIG. 7.

In accordance with the illustrative embodiment of the invention, $\forall_i$ is calculated in the embedder as described above in the section Calculating $\forall$. The estimator 460 of the remover of FIG. 6 recalculates a in analogous manner from coefficients $C_i$ which have been restored to their original values.

Thus referring for example to FIG. 3A and to FIGS. 6 and 7, the modified coefficients $C_i'$ are stored in a frame store 300 indicatd as FS3 in the wavelet transformer of FIG. 6 in the same way as shown in FIG. 3A and they are serially ordered in the same way as described with reference to FIG. 3A. It will be recalled that coefficient $C_1'$ has no preceding coefficients so $\alpha_1 = k$ and $C_1 = C_1' - kR_1$. For each subsequent coefficient $C_i$, $\forall_i$ is calculable from the set of $N_i$ of preceding restored coefficients, all of which have been restored to their original value according to $$C_i = C_i' - \alpha_i . R_i'.$$

Referring to FIG. 7, the calculation procedure starts at step S5. At step S7, i is initialised to 0. At step S9, i is incremented by 1 to calculate $\alpha_1$ at step S11 for coefficient $C_1'$. At step S13 the original value $C_1$ is calculated from coefficients $C_1'$. The procedure then reverts to step S9 and i is incremented. The procedure continues until all coefficients $C_i'$ have been restored to their original values $C_i$.

As in the embedder of FIG. 2, the calculation of a may be modified in one or both of the following ways:—
1) If $\alpha_i < \alpha_{TL}$, it is incremented to $\alpha_{TL}$, where $\alpha_{TL}$ is a lower threshold; and
   if $\alpha_i > \alpha_{TH}$ it is reduced to $\alpha_{TH}$, where $\alpha_{TH}$ is an upper threshold.
2) The magnitude $|C_n|$ of each coefficient is compared with a threshold $C_{TH}$.
   If $|C_n| > C_{TH}$ then $C_n$ is not included in the calculation of $\alpha_i$; or
   if $|C_n| > C_{TH}$, then $C_n$ is clipped to $(C_n/|C_n|)C_{TH}$.

Modifications.

As mentioned above the coefficients from which the value of ($\alpha_i$ is calculated may be in different bands to the related coefficient $C_i$ which is to be modified or restored to its original value. Thus by way of example, referring to FIG. 8; the set of coefficients $\{C_n\}_i$ used to calculate $\alpha_i$ of band hH, IV may be in the other bands. In the example of FIG. 8 the set $\{C_n\}_i$ is shown as including coefficients $C_{1i}$, $C_{2i}$ and $C_{3i}$ which are at positions related to the position of coefficient $C_i$. In this way, image properties in other bands are taken into account in calculating $\alpha_i$ to ensure that the watermark is imperceptible.

The coefficients $C_{1i}$, $C_{2i}$ and $C_{3i}$ used to modify or restore $C_i$, may be coefficient which are never modified. That can be done by modifying only coefficients in one or more bands such as hH, 1V and leaving the coefficients in other bands unmodified. Alternatively at least some of the coefficients $C_{1i}$, $C_{2i}$ and $C_{3i}$ used to modify or restore $C_i$ may be modified. That can be done by storing the coefficients in a frame store 300 as shown in FIG. 3 or 8 and by reading out coefficients in an order which allows the procedures of FIGS. 4 and 7 to be followed.

It will be appreciated that whilst the foregoing discussion refers for ease of explanation to only 3 coefficients $C_{1i}$, $C_{2i}$ and $C_{3i}$ in 3 bands in one level, in practice many more coefficients may be used and the coefficients may be in more than three bands and in more than one level.

Other Transforms

Whilst the invention has been described by way of example with reference to Wavelet transforms, it may be used with other transforms for example DCT.

Other Material

Whilst the invention has been described by way of example with reference to material comprising video material (still or moving images), it may be applied to other material, for example audio material and data material.

PRBS

As described hereinabove, the PRBS has a length of L J where J is the number of bits in a UMID. Thus each bit $W_j$ of the UMID modulates a section of length L of the PRBS. Instead, it may have a length of L bits and be repeated for each bit j of the UMID.

Other Watermark Data

Whilst the invention has been described by way of example with reference to UMIDs as the watermark data, it may be used with other data as the watermark.

Using Modified Coefficients to Calculate $\forall_i$

The foregoing embodiment calculates $\forall_i$ using unmodified coefficients. In alternative embodiments $\forall$ is calculated using modified coefficients or a combination of modified and unmodified coefficients. The coefficients $C_i$ are serially ordered. The coefficients used to calculate $\forall i$ for coefficient $C_i$ are coefficients preceding i on the serial order.

Figure 9:
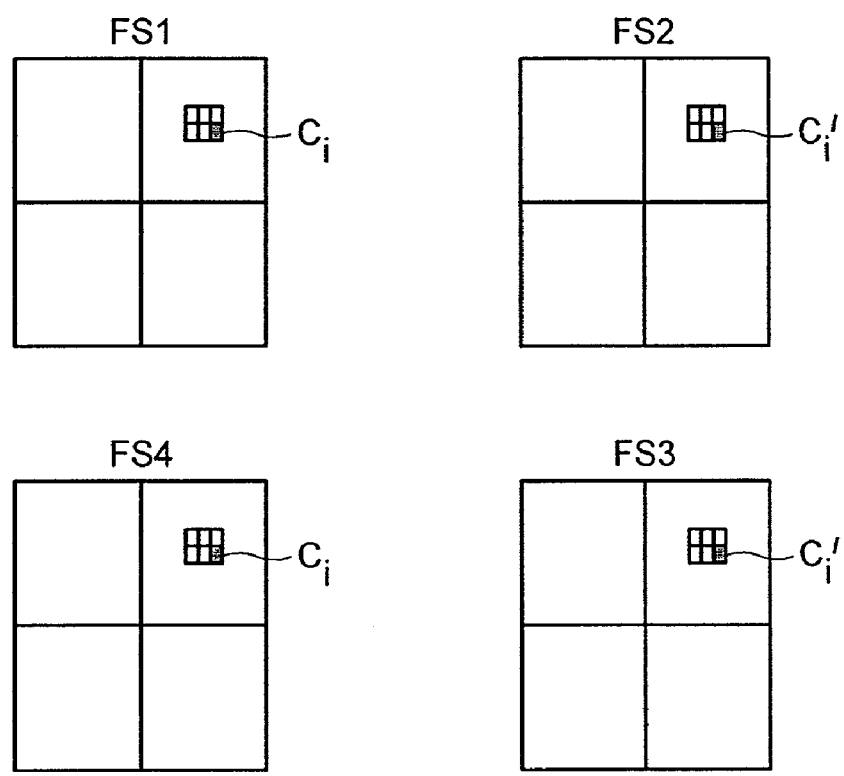
FIG. 9 is a schematic diagram illustrating the operation of frame stores in the embedder of FIG. 2 and the remover of FIG. 6.

Referring to FIGS. 2, 6 and 9 frames stores FS1, FS2, FS3 and FS4 are provided in the wavelet transformer 210, the inverse wavelet transformer 250, the wavelet transformer 410 and the inverse wavelet transformer 450. Frame stores FS 1 and FS4 store unmodified coefficients. Frame stores FS2 and FS3 store modified coefficients $C'_i$.

Thus there are available both at the encoder and at the remover serially ordered sets of unmodified and modified coefficients.

In the embedder of FIG. 2, as coefficients $C_i$ in store FS1 are modified, they are stored in FS2 as coefficients $C_i'$. Thus modified coefficients $C_i'$ are available to calculate $\forall_i$. Thus the set $\{C_n\}i$ used to calculate $\forall_i$ for modifying coefficient $C_i$ may comprise modified coefficients C' preceding $C_i$ optionally together with unmodified coefficients C preceding $C_i$.

At the remover modified coefficients $C_i'$ are stored in store FS3. As the coefficients are restored, restored coefficients $C_i$ are stored in store FS4. Thus modified coefficients C' are available to calculate $\forall_i$ optionally together with restored coefficients C.

As diagrammatically shown in FIG. 9, sets of coefficients preceding a coefficient $C_i$ or $C_i'$ are present in all four frame stores FS1, FS2, FS3 and FS4.

Shape of sets $\{C_n\}i$

A set $\{C_n\}i$ may have any convenient shape. Where $\forall_i$ is calculated only from coefficients preceding $C_i$, the set may consist of coefficients immediately preceding $C_i$. Where the coefficients are raster scanned to serially order them, the set may consist of coefficients on the same scanning line as $C_i$. Alternatively, it may consist of coefficients on that line and a preceding line. Other shapes are possible.

Figure 10:
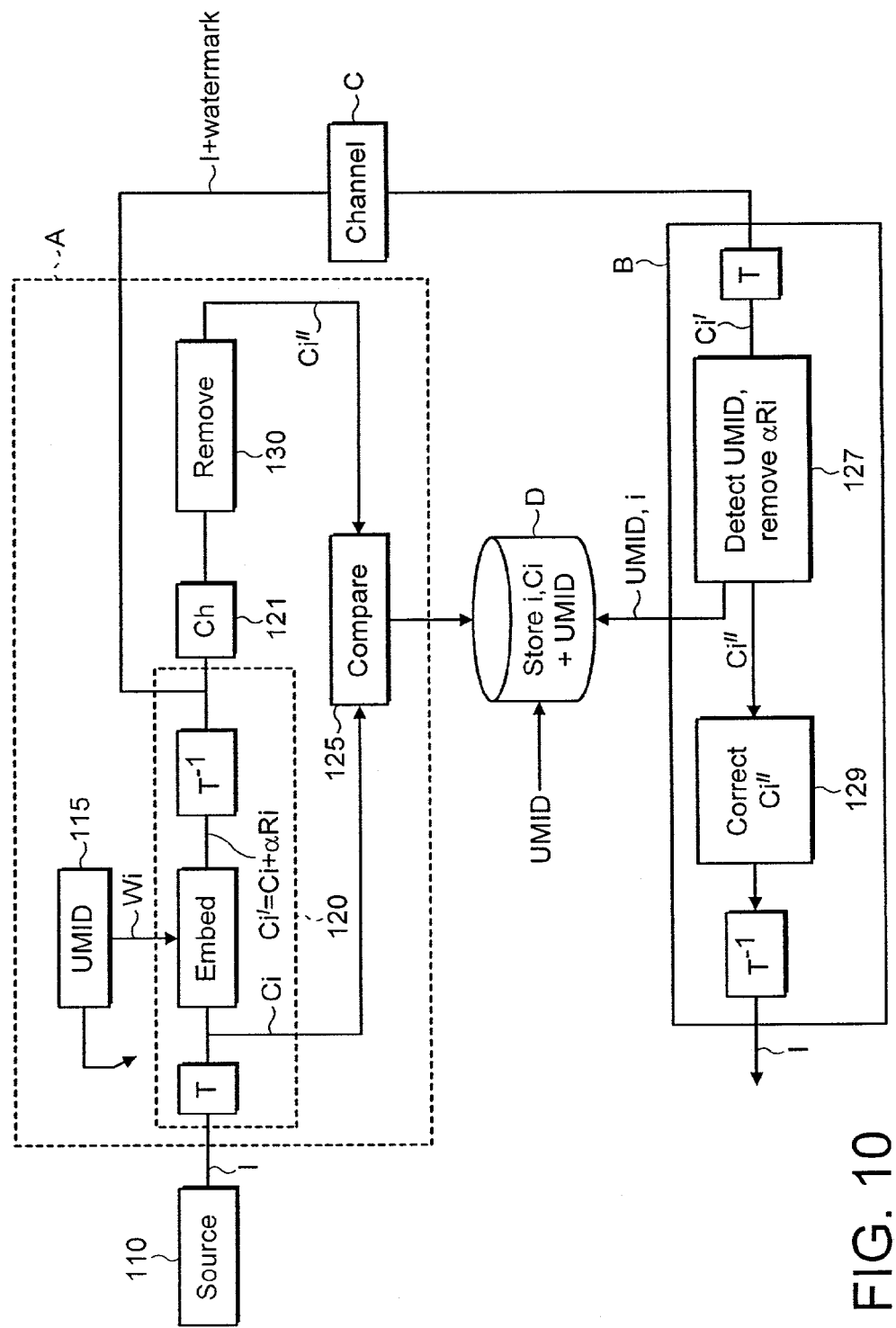
FIG. 10 is a schematic block diagram of an illustrative watermark embedding and removal system in accordance with the invention.

FIG. 10 illustrates a system, in this example a watermarking system, for embedding a watermark onto an image I and for recovering and removing it from the image. The watermarking system comprises: a source 110 of the image I; a sub system A for applying the watermark; a sub-system B for detecting and removing the watermark; a channel C linking the sub-systems A and B; and a database D.

In overview, the subsystem A applies the watermark to the image. The watermarked image is transmitted via the channel C to the subsystem B where the watermark is detected and removed. It is desired to restore the original image in the subsystem B with no degradation. For that purpose, at the subsystem A the watermark is removed from the image by a remover 130 and the thus restored image is compared with the original image I to detect differences and the locations within the image of the differences. The database D stores the locations of differences and correction data which may be values of the original image at those locations or the differences. The subsystem B detects and removes the watermark to produce a substantially restored image. The removal process is the same as at the subsystem A. The locations of corrections and the corrections are read from the database and the corrections applied to the restored image to correct it. In practice the system will operate on many images. Thus it is necessary to identify the images and the correction data associated therewith in the database D. In this example each image is identified by an identifier which is used to access the relevant data in the database. Preferably the identifier is a UMID. UMIDs are described in the section UMIDs below. Most preferably the watermark comprises the UMID. In the example of FIG. 1, the image is transformed by a wavelet transform. Wavelet transforms are discussed in the section Wavelets below. In the example of FIG. 1 wavelet coefficients are compared to determine the said differences.

FIRST EXAMPLE

Referring to FIG. 10, the source 110 produces a spatial domain image I. An embedder 120 receives a UMID from a generator 115 and embeds the UMID as the watermark in wavelet coefficients $C_i$ of a wavelet transform (T) of the image according to $$C_i' = C_i + \alpha R_i$$

where $C_i$ is the i'" original image coefficient. $C_i$ is the $i^{th}$ modified coefficient, $R_i$ is $i^{th}$ bit of watermark data and $\alpha$ is a scaling factor. As described hereinafter $R_i$ may be a bit of a pseudo random symbol sequence modulated by the UMID data $W_i$.

The remover 130 removes the watermark to produce restored coefficients $C_i''$ according to $$C_i'' = C_i' - \alpha R_i$$

A comparator 125 compares the restored coefficients $C_i''$ with the original coefficients $C_i$ to determine any differences and the locations thereof. The differences and locations i are stored in the database D as correction data together with the UMID generated by generator 115.

The coefficients $C_i'$ produced by the embedder 120 are inverse transformed ($T^{-1}$) and applied to the channel C.

The subsystem B receives the watermarked image from the channel C. A transformer T recreates the coefficients $C_i'$. The UMID is detected and removed by a detector and remover 127. The detected UMID is used to access the correction data in the data base and the correction data is applied to the image coefficients $C_i''$ in a corrector 129 to restore the original coefficients $C_i$ which may be inverse transformed ($T^{-1}$) to restore the original image 1.

In this first example, $\alpha$ is a fixed predetermined value. Using a fixed predetermined value of $\alpha$ facilitates removal of the watermark.

For the purposes of the first example, the channel C is preferably "lossless": that is it does not distort the watermarked spatial domain image.

SECOND EXAMPLE

The second example is identical to the first except that a channel emulator 121 is provided between the embedder 120 and remover 130. The emulator applies, to the output of the embedder, a channel emulator function emulating the effect of channel C on the output of the embedder.

The channel emulation 121 emulates the channel C. Thus errors introduced by the channel C can be detected and corrections stored in the database D.

This is useful especially if the channel C is lossy.

THIRD EXAMPLE

This modifies the first or second example in that ∀ is not fixed. The embedder 120 is shown in FIG. 11 and the remover 130, 127 is shown in FIG. 12.

Figure 11:
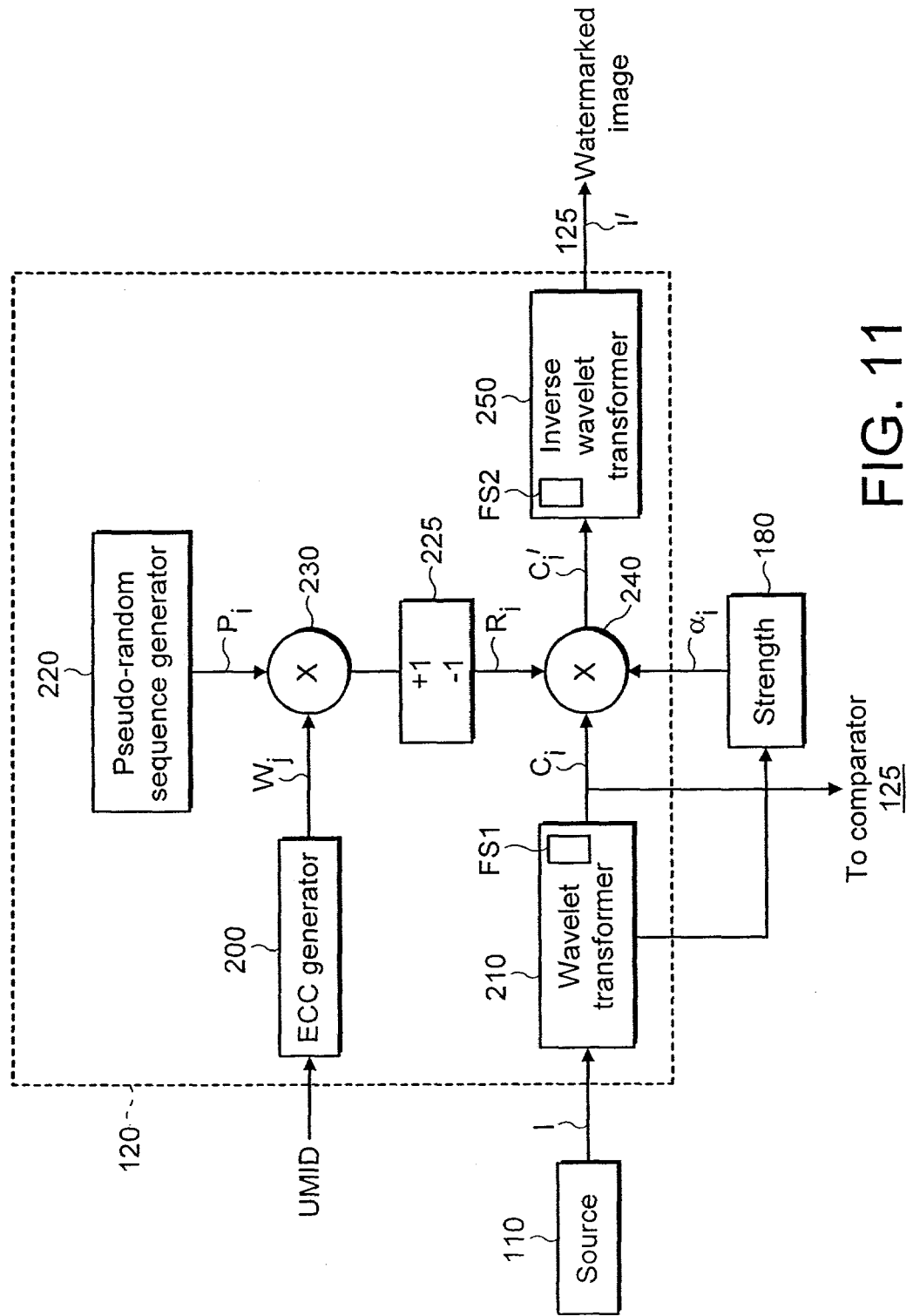
FIG. 11 is a schematic block diagram of an embedder of the system of FIG. 10.
Figure 12:
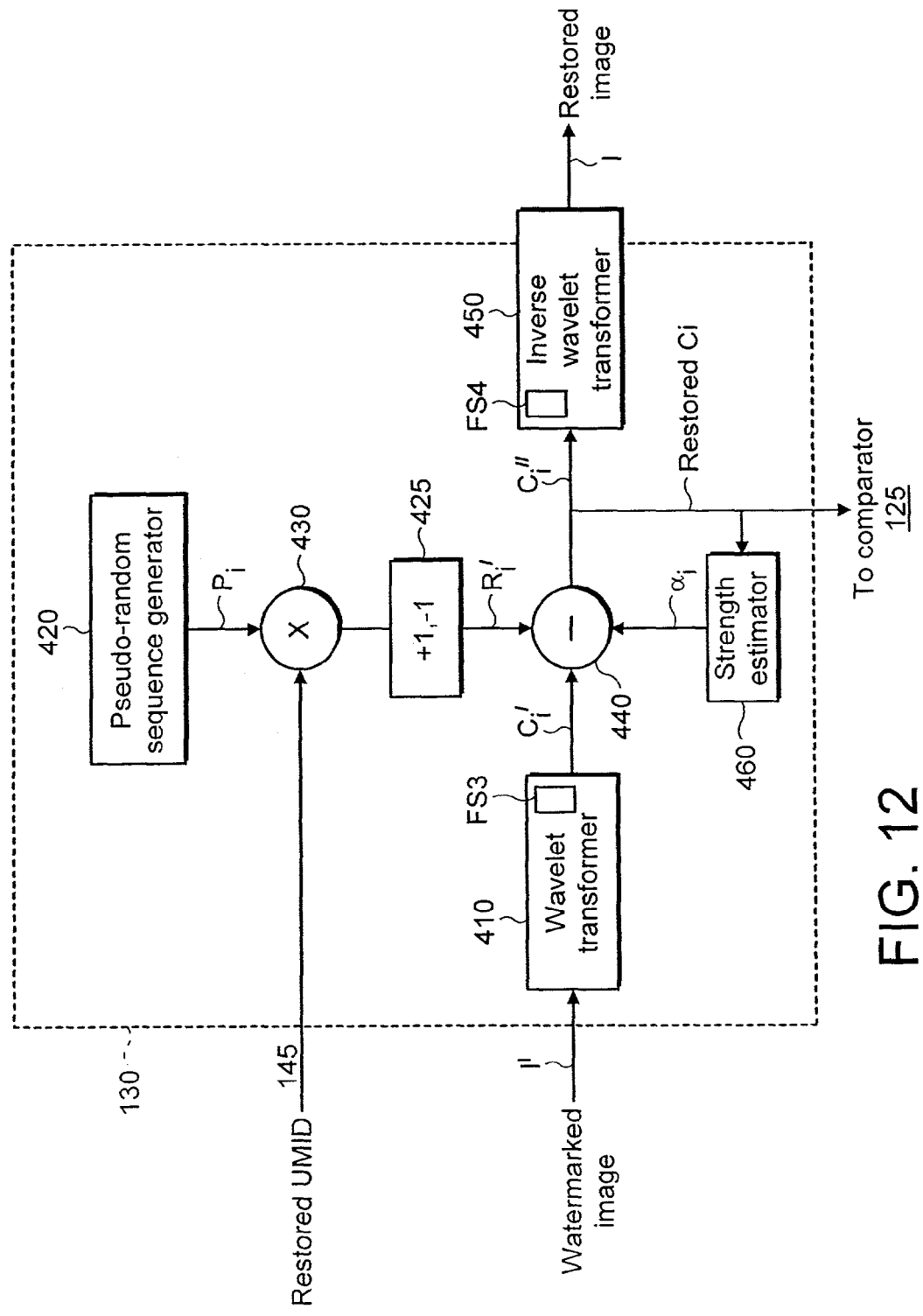
FIG. 12 is a schematic block diagram of a remover of the system of FIG. 10.

FIG. 11 is identical to FIG. 2 described above except that it has a connection supplying the wavelet coefficients $C_i$ to the comparator 125 of FIG. 10. Likewise, FIG. 12 is identical to FIG. 6 above except it has a connection supplying the restored coefficients to the comparator 125 of FIG. 10. Thus no further description is needed of FIGS. 11 and 12.

Modifications

Whilst the aspect of the invention described with reference to FIGS. 10 to 12 embeds and removes watermarks as described with reference to FIGS. 1 to 9, other watermark embedding and removal techniques may be used.

Wavelets

Wavelets are well known and are described in for example "A Really Friendly Guide to Wavelets" by C Valens, 1999 and available at http://perso.wanadoo.fr/polyvalens/clemens/wavelets/wavelets.html.

Valens shows that the discrete wavelet transform can be implemented as an iterated filter bank as used in sub-band coding, with scaling of the image by a factor of 2 at each iteration.

Figure 13:
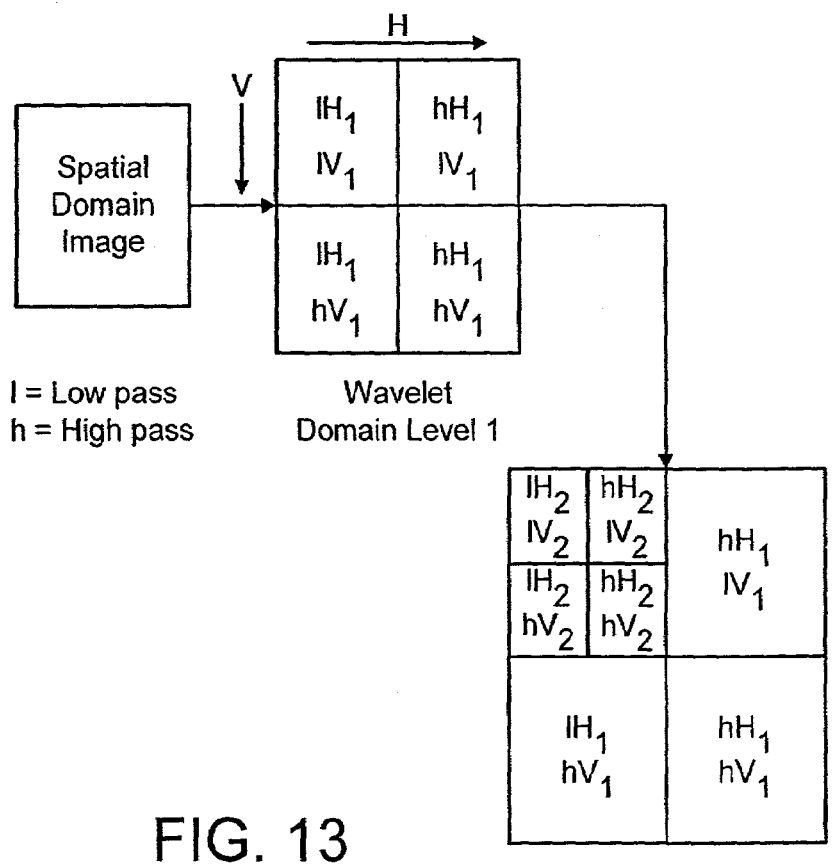
FIGS. 13 and 14 are diagrams used herein below to describe wavelets transforms.

Thus referring to FIG. 13, a spatial domain image is applied to a set of high pass HP and low pass LP filters. At level 1, the first stage of filtering, the image is filtered horizontally and vertically and, in each direction, scaled down by a factor of 2. In level 2, the low pass image from level 1 is filtered and scaled in the same way as in level 1. The filtering and scaling may be repeated in subsequent levels 3 onwards.

Figure 14:
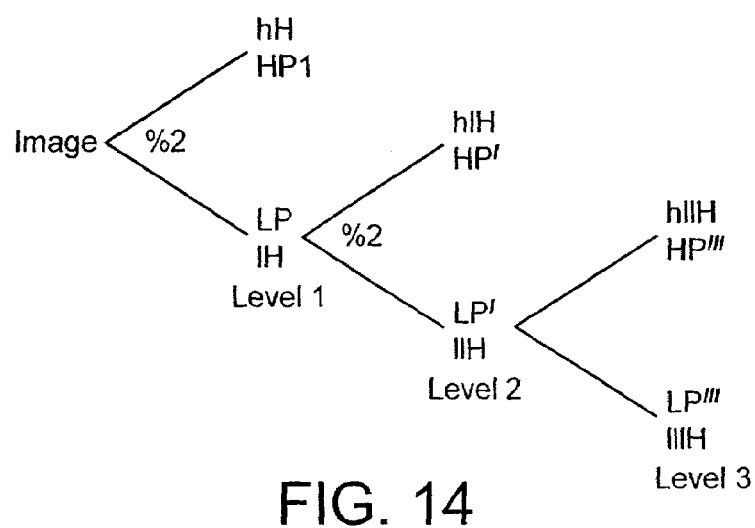

The result is shown schematically in FIG. 14. FIG. 10 is a representation normal in the art. At level one the image is spatially filtered into four bands: the lower horizontal and vertical band, $1H_1, hV_1$; the upper horizontal band $hH_1, 1V_1$: the upper vertical band $1H_1, hV_1$; and the upper horizontal and vertical band, $hH_1, hV_1$. At level 2, the lower horizontal and vertical band. $1H_1, 1V_1$ is filtered and scaled into the lower horizontal and vertical band, $1H_2, 1V_2$: the upper horizontal band $hV_1$; $1V_2$: the upper vertical band $1H_2, bV_2$;

and the upper horizontal and vertical band, $hH_2$, $hV_2$. At level 3 (not shown in FIG. 10), the lower horizontal and vertical band. $1H_2$. $1V_2$ is further filtered and scaled.

UMIDs

Figure 15:
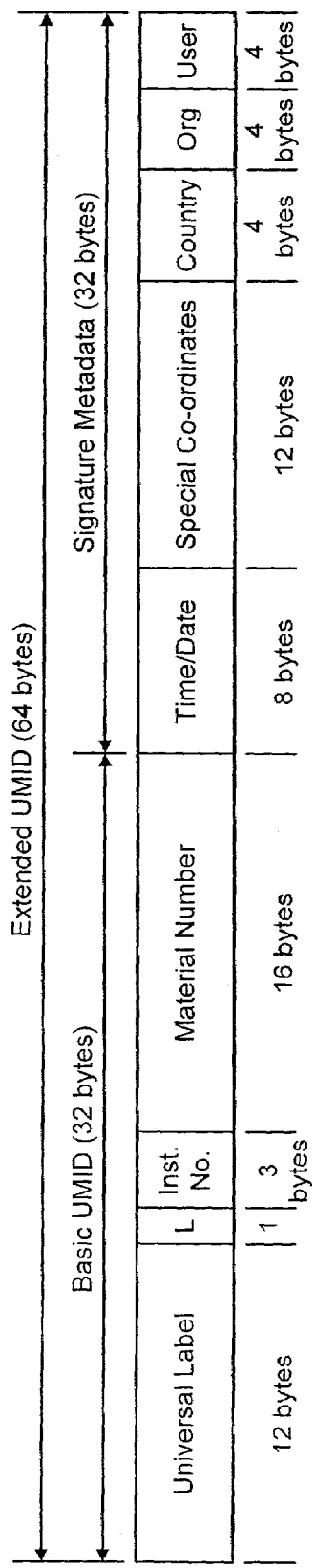
FIGS. 15 and 16 are diagrams of data structures of UMIDs.

The UMID or Unique Material Identifier is described in SMPTE Journal March 2000. Referring to FIG. 15 an extended UMID is shown. It comprises a first set of 32 bytes of basic UMID and a second set of 32 bytes of signature metadata.

The first set of 32 bytes is the basic UMID. The components are:

A 12-byte Universal Label to identify this as a SMPTE UMID. It defines the type of material which the UMID identifies and also defines the methods by which the globally unique Material and locally unique Instance numbers are created.

A 1-byte length value to define the length of the remaining part of the UMID.

A 3-byte Instance number which is used to distinguish between different 'instances' of material with the same Material number.

A 16-byte Material number which is used to identify each clip. Each Material number is the same for related instances of the same material.

The second set of 32 bytes of the signature metadata as a set of packed metadata items used to create an extended UMID. The extended UMID comprises the basic UMID followed immediately by signature metadata which comprises:

An 8-byte time/date code identifying the time and date of the Content Unit creation.

A 12-byte value which defines the spatial co-ordinates at the time of Content Unit creation.

3 groups of 4-byte codes which register the country, organisation and user codes Each component of the basic and extended UMIDs will now be defined in turn.

The 12-Byte Universal Label

The first 12 bytes of the UMID provide identification of the UMID by the registered string value defined in table 1.

TABLE 1

Specification of the UMID Universal Label

| Byte No. | Description | Value (hex) |
|---|---|---|
| 1 | Object Identifier | 06h |
| 2 | Label size | 0Ch |
| 3 | Designation: ISO | 2Bh |
| 4 | Designation: SMPTE | 34h |
| 5 | Registry: Dictionaries | 01h |
| 6 | Registry: Metadata Dictionaries | 01h |
| 7 | Standard: Dictionary Number | 01h |
| 8 | Version number | 01h |
| 9 | Class: Identification and location | 01h |
| 10 | Sub-class: Globally Unique Identifiers | 01h |
| 11 | Type: UMID (Picture, Audio, Data, Group) | 01, 02, 03, 04h |
| 12 | Type: Number creation method | XXh |

The hex values in table 1 may be changed: the values given are examples. Also the bytes 1–12 may have designations other than those shown by way of example in the table. Referring to the Table 1, in the example shown byte 4 indicates that bytes 5–12 relate to a data format agreed by SMPTE. Byte 5 indicates that bytes 6 to 10 relate to "dictionary" data. Byte 6 indicates that such data is "metadata" defined by bytes 7 to 10. Byte 7 indicates the part of the dictionary containing metadata defined by bytes 9 and 10. Byte 10 indicates the version of the dictionary. Byte 9 indicates the class of data and Byte 10 indicates a particular item in the class.

Figure 16:

In the present embodiment bytes 1 to 10 have fixed preassigned values. Byte 11 is variable. Thus referring to FIG. 15, and to Table 1 above, it will be noted that the bytes 1 to 10 of the label of the UMID are fixed. Therefore as shown in FIG. 16 they may be replaced by a 1 byte 'Type' code T representing the bytes 1 to 10. The type code T is followed by a length code L. That is followed by 2 bytes, one of which is byte 11 of Table 1 and the other of which is byte 12 of Table 1, an instance number (3 bytes) and a material number (16 bytes). Optionally the material number may be followed by the signature metadata of the extended UMID and/or other metadata.

The UMID type (byte 11) has 4 separate values to identify each of 4 different data types as follows:

'01h'=UMID for Picture material
'02h'=UMID for Audio material
'03h'=UMID for Data material
'04h'=UMID for Group material (i.e. a combination of related essence).

The last ($12^{th}$) byte of the 12 byte label identifies the methods by which the material and instance numbers are created. This byte is divided into top and bottom nibbles where the top nibble defines the method of Material number creation and the bottom nibble defines the method of Instance number creation.

Length

The Length is a 1-byte number with the value '13h' for basic UMIDs and '33h' for extended UMIDs.

Instance Number

The Instance number is a unique 3-byte number which is created by one of several means defined by the standard. It provides the link between a particular 'instance' of a clip and externally associated metadata. Without this instance number, all material could be linked to any instance of the material and its associated metadata.

The creation of a new clip requires the creation of a new Material number together with a zero Instance number. Therefore, a non-zero Instance number indicates that the associated clip is not the source material. An Instance number is primarily used to identify associated metadata related to any particular instance of a clip.

Material Number

The 16-byte Material number is a non-zero number created by one of several means identified in the standard. The number is dependent on a 6-byte registered port ID number, time and a random number generator.

Signature Metadata

Any component from the signature metadata may be null-filled where no meaningful value can be entered. Any null-filled component is wholly null-filled to clearly indicate a downstream decoder that the component is not valid.

The Time-Date Format

The date-time format is 8 bytes where the first 4 bytes are a UTC (Universal Time Code) based time component. The time is defined either by an AES3 32-bit audio sample clock or SMPTE 12M depending on the essence type.

The second 4 bytes define the date based on the Modified Julian Data (MJD) as defined in SMPTE 309M. This counts up to 999,999 days after midnight on the $17^{th}$ Nov. 1858 and allows dates to the year 4597.

The Spatial Co-Ordinate Format

The spatial co-ordinate value consists of three components defined as follows:

Altitude: 8 decimal numbers specifying up to 99,999,999 meters.

Longitude: 8 decimal numbers specifying East/West 180.00000 degrees (5 decimal places active).

Latitude: 8 decimal numbers specifying North/South 90.00000 degrees (5 decimal places active).

The Altitude value is expressed as a value in meters from the centre of the earth thus allowing altitudes below the sea level.

It should be noted that although spatial co-ordinates are static for most clips, this is not true for all cases. Material captured from a moving source such as a camera mounted on a vehicle may show changing spatial co-ordinate values.

Country Code

The Country code is an abbreviated 4-byte alpha-numeric string according to the set defined in ISO 3166. Countries which are not registered can obtain a registered alpha-numeric string from the SMPTE Registration Authority.

Organisation Code

The Organisation code is an abbreviated 4-byte alpha-numeric string registered with SMPTE. Organisation codes have meaning only in relation to their registered Country code so that Organisation codes can have the same value in different countries.

User Code

The User code is a 4-byte alpha-numeric string assigned locally by each organisation and is not globally registered. User codes are defined in relation to their registered Organisation and Country codes so that User codes may have the same value in different organisations and countries.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of embedding data in material, the method comprising the steps of:

producing transform coefficients $C_i$ representing a transform of the material, and combining the coefficients $C_i$ with data symbols $R_i$ to produce modified coefficients $C_i'$ where $$C_i' = C_i + \alpha_i R_i$$

the method further comprising determining an adaptation strength $\alpha_i$ for each unmodified coefficient $C_i$ as a function $F\{C_n\}_i$ of a predetermined set $\{C_n\}_i$ of transform coefficients $C_n$ which set excludes the coefficient $C_i$ wherein the coefficients are serially ordered and the coefficients $C_n$ are coefficients preceding coefficient $C_i$.

2. The method according to claim 1, wherein the coefficients the set $\{C_n\}_i$ vary with i.

3. The method according to claim 1, wherein the number $N_i$ of coefficients in the set $\{C_n\}_i$ varies with i.

4. The method according to claim 1, wherein the coefficients of the set $\{C_n\}_i$ have a predetermined positional relationship with the coefficient $C_i$ to be modified.

5. The method according to claim 1, wherein the coefficients represent a spatial frequency transform of the material.

6. The method according to claim 1, wherein the coefficients represent a wavelet transform of the material.

7. The method according to claim 6, wherein the transform produces coefficients $C_i$ in a plurality of bands.

8. The method according to claim 7, wherein the transform coefficients forming the set $\{C_n\}_i$ are all in the same band.

9. The method according to claim 7, wherein the transform coefficients forming the set $\{C_n\}_i$ are in a plurality of bands.

10. The method according to claim 1, wherein the said function $F\{C_n\}_i$ is such that $$\alpha i = \frac{1}{Ni} \cdot \sqrt{\Sigma C_n^2}$$

for n=i-1 to i-$N_i$ for $N_i \neq 0$ and $\alpha_i = k$ for $N_i = 0$, where $N_i$ is the number of coefficients $C_n$ in set i.

11. The method according to claim 1, wherein the said data symbols $R_i$ are of a pseudo random symbol sequence having symbols $P_i$ modulated by data $W_j$ to be embedded.

12. The method according to claim 1, wherein the data is imperceptibly embedded in the other material.

13. The method according to claim 1, wherein the set $\{C_n\}_i$ includes unmodified coefficients.

14. The method according to claim 1, wherein the set $\{C_n\}_i$ consists of modified coefficients preceding $C_i$ where the coefficients are serially ordered.

15. The method according to claim 1, wherein the set $\{C_n\}_i$ comprises at least one modified coefficient and at least one unmodified coefficient.

16. A computer program product arranged to carry out the method of claim 1 when run on a computer.

17. The method according to claim 1, wherein the material is video material.

18. The method according to claim 1, wherein the material is audio material.

19. The method according to claim 1, wherein the material is audio/visual material.

20. An apparatus for embedding data in material, comprising a transformer for producing transform coefficients $C_i$ representing a transform of the material, and a combiner for combining the coefficients $C_i$ with data symbols $R_i$ to produce modified coefficients $C_i'$ where $$Ci' = C_i + \alpha_i R_i$$

the apparatus further comprising a calculator for calculating an adaptation strength $\alpha_i$ for each unmodified coefficient $C_i$ as a function $F\{C_n\}_i$ of a predetermined set $\{C_n\}_i$ of transform coefficients $C_n$ which set excludes the coefficient $C_i$, wherein the coefficients are serially ordered and the coefficients $C_n$ are coefficients preceding coefficient $C_i$.

21. The apparatus according to claim 20, wherein the coefficients of the set $\{C_n\}_i$ vary with i.

22. The apparatus according to claim 20, wherein the unmodified coefficients of the set $\{C_n\}_i$ have a predetermined positional relationship with the coefficient $C_i$ to be modified.

23. The apparatus according to claim 20, wherein the coefficients represent a spatial frequency transform of the material.

24. The apparatus according to claim 20, wherein the coefficients represent a wavelet transform of the material.

25. The apparatus according to claim 24, wherein the transformer produces coefficients $C_i$ in a plurality of frequency bands.

26. The apparatus according to claim 25, wherein the transform coefficients forming the set $\{C_n\}_i$ are all in the same band.

27. The apparatus according to claim 26, wherein the transform coefficients forming the set $\{C_n\}_i$ are in a plurality of bands.

28. The apparatus according to claim 20, wherein the said function $F\{C_n\}_i$ is such that $$\alpha i = \frac{1}{N_i} \cdot \sqrt{\Sigma C_n^2}$$

where $N_i$ is the number of coefficients $C_n$ in set i.

29. The apparatus according to claim 20, wherein the data is imperceptibly embedded in the other material.

30. The apparatus according to claim 20, wherein the set $\{C_n\}$ consists of unmodified coefficients.

31. The apparatus according to claim 20, wherein the set $\{C_n\}_i$ includes unmodified coefficients.

32. The apparatus according to claim 20, wherein the set $\{C_n\}_i$ comprises at least one modified coefficient and at least one unmodified coefficient.

33. An apparatus for removing data embedded in material, the apparatus comprising:
a processor for determining the values of the symbols $R_i$;
a calculator for calculating, for each modified coefficient $C_i'$, the value of the said function $F\{C_n\}_i$ of the corresponding set $\{C_n\}_i$ of coefficients $C_n$ to determine $\alpha_i$; and
a subtractor which, for each modified coefficient $C_i'$, subtracts therefrom $\alpha_i.R_i$ to restore the unmodified coefficient value $C_i$, which thereby becomes available for use as an unmodified coefficient of another set $\{C_n\}_i$ of unmodified coefficients $C_n$ for restoring another coefficient $C_i'$, wherein the coefficients are serially ordered and the said set $\{C_n\}_i$ consists of coefficients preceding coefficient $C_i$.

34. The apparatus according to claim 33, wherein the said set $\{C_n\}_i$ consists of restored coefficients $C_i$ and further comprising means for using a restored coefficient $C_i$ as a coefficient of another set $\{C_n\}_{i+1}$ of coefficients for restoring another coefficient $C_{i+1}$.

35. The apparatus according to claim 34, wherein the said set $\{C_n\}_i$ includes modified coefficients preceding coefficient $C_i$.

36. The apparatus according to claim 34, wherein the said set $\{C_n\}_i$ comprises at least one modified coefficient and at least one restored coefficient, the coefficients preceding $C_i'$.

37. The apparatus according to claim 33, further comprising means for determining the values of the data bits $W_j$ embedded in the material, said means for determining comprising a correlator for correlating a reference pseudo random symbol sequence with the modified coefficients $C_i'$, a decoder for decoding the correlations to determine the data $W_j$ modulating the modulated sequence and a modulator for remodulating the reference sequence with the said data to restore $R_i$.

38. A method of removing data embedded in material, the method comprising:
determining the values of the data symbols $R_i$;
calculating, for each modified coefficient $C_i'$, the value of the said function; $F\{C_n\}_i$ of the corresponding set $\{C_n\}_i$ of coefficients $C_n$ to determine $\alpha_i$; and
for each modified coefficient $C_i'$, subtracting therefrom $\alpha_i.R_i$ to restore the unmodified coefficient value $C_i$, wherein the coefficients are serially ordered and the said set $\{C_n\}_i$ consists of modified coefficients preceding coefficient $C_i$.

39. The method according to claim 38, wherein the said set $\{C_n\}_i$ includes restored coefficients $C_i$, the method further comprising a step of using a restored coefficient $C_i$ as a coefficient of another set $\{C_n\}_j$ of coefficients for restoring another coefficient $C_j$.

40. The method according to claim 38, wherein the said set $\{C_n\}_i$ comprises at least one modified coefficient and at least one restored coefficient, the coefficients preceding $C_i'$.

41. The method according to claim 38, further comprising the step of determining the values of the data bits $W_j$ embedded in material by correlating a reference pseudo random symbol sequence with the modified coefficients $C_i'$ and decoding the correlation values to determine the data $W_j$ modulating the pseudo random sequence and remodulating the reference sequence with the said data to restore $R_i$.

42. A computer program product arranged to carry out the method of claim 38 when run on a computer.

* * * * *